United States Patent [19]

Smith

[11] Patent Number: 5,509,887
[45] Date of Patent: Apr. 23, 1996

[54] APPARATUS FOR POCKETED COIL CONSTRUCTION HAVING IMPROVED TRACKING CHARACTERISTICS

[75] Inventor: Rusland J. Smith, Roaring Brooks Township, Pa.

[73] Assignee: Simmons Company, Atlanta, Ga.

[21] Appl. No.: 424,552

[22] Filed: Apr. 17, 1995

Related U.S. Application Data

[60] Continuation of Ser. No. 3,259, Jan. 12, 1993, abandoned, which is a division of Ser. No. 637,290, Jan. 3, 1991, Pat. No. 5,186,435.

[51] Int. Cl.$^6$ ..................... B31F 1/00
[52] U.S. Cl. ..................... 493/439
[58] Field of Search ..................... 493/439, 445, 493/440; 29/91.1

[56] References Cited

U.S. PATENT DOCUMENTS

| 229,479 | 6/1880 | Scholfield | 493/439 |
|---|---|---|---|
| 466,023 | 12/1891 | Sutton | 493/439 |
| 2,619,057 | 11/1952 | Ellis | 493/439 |
| 2,879,060 | 3/1959 | Leiss et al. | 493/439 |
| 3,561,187 | 2/1971 | Rohnert et al. | 493/439 |
| 3,954,258 | 5/1976 | Skipor et al. | 493/445 |
| 4,439,977 | 4/1984 | Stumpf | 53/428 |
| 4,646,511 | 3/1987 | Boeckmann et al. | 493/439 |
| 4,666,423 | 5/1987 | Herrington | 493/439 |

FOREIGN PATENT DOCUMENTS

| 259233 | 6/1912 | Germany | 493/439 |
|---|---|---|---|

*Primary Examiner*—P. W. Echols
*Attorney, Agent, or Firm*—Jones, Day, Reavis & Pogue

[57] ABSTRACT

Improvements to a method and apparatus are disclosed for making a series of coil springs pocketed within individual pockets in an elongate fabric strip comprised of two overlying plies capable of being welded together. Improvements include improvements to fabric tracking and folding, fabric handling along the fabric path, and various direct-drive configuration eliminating the need for pneumatic cylinders.

7 Claims, 12 Drawing Sheets

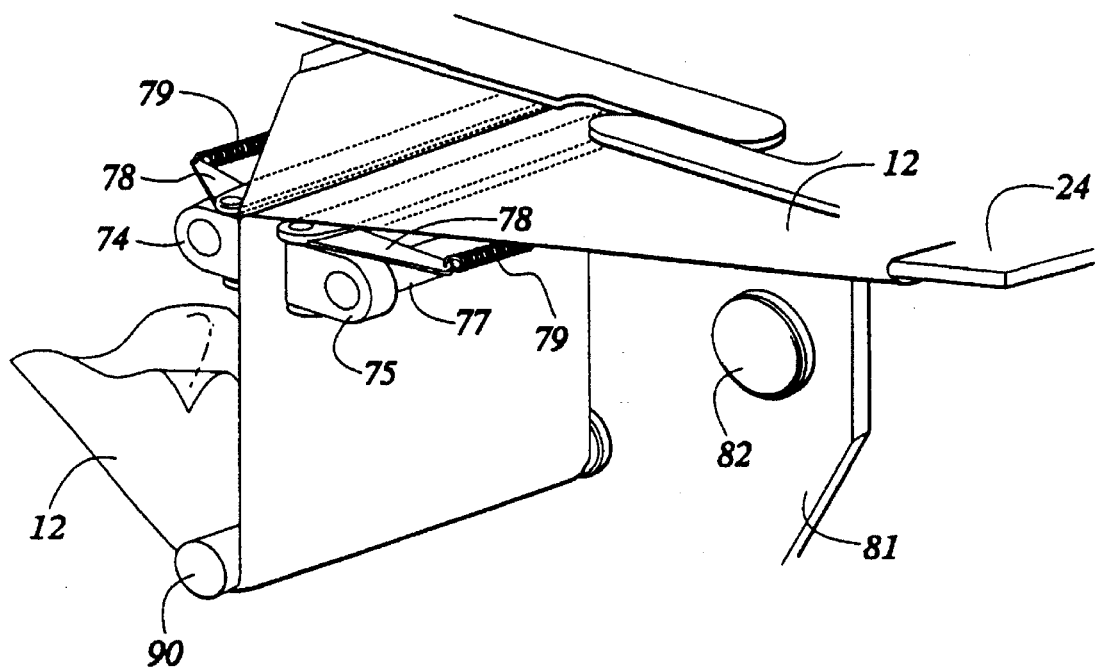
FIG 4
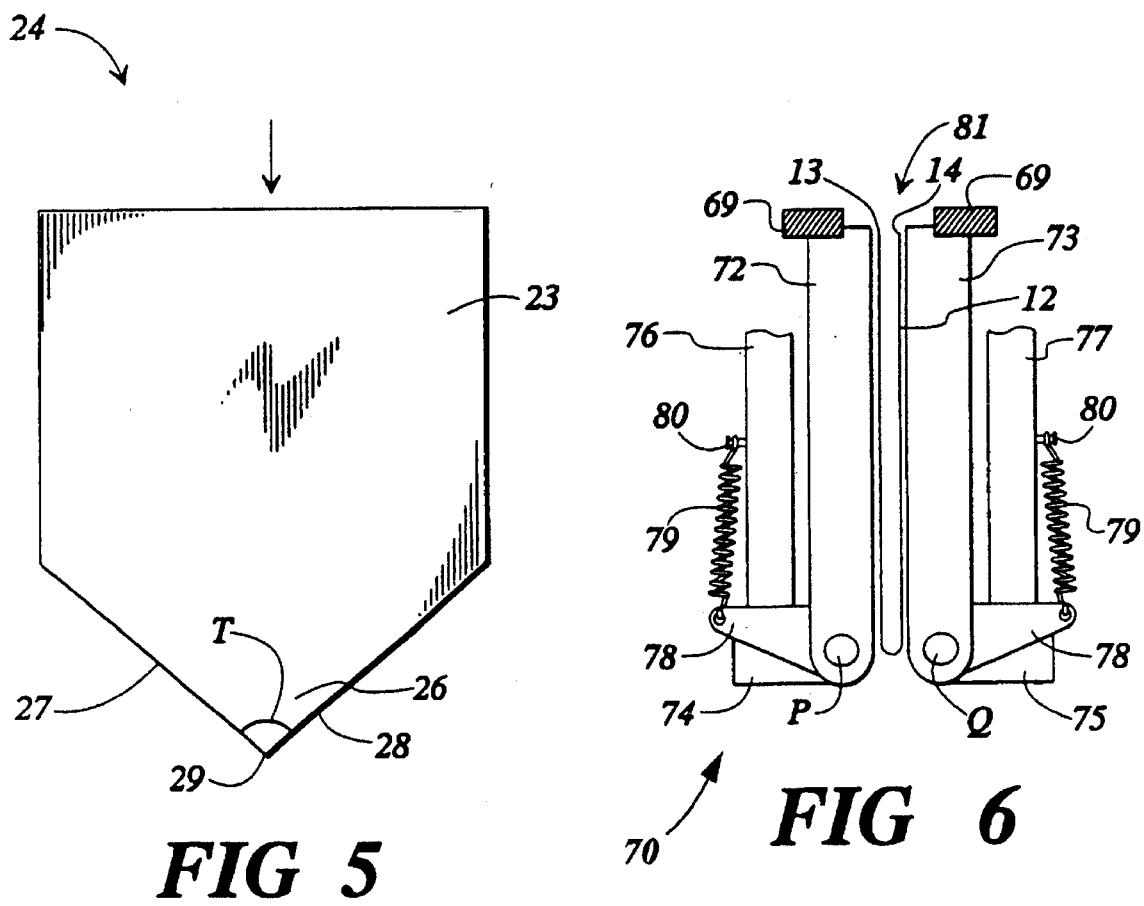
FIG 5   FIG 6

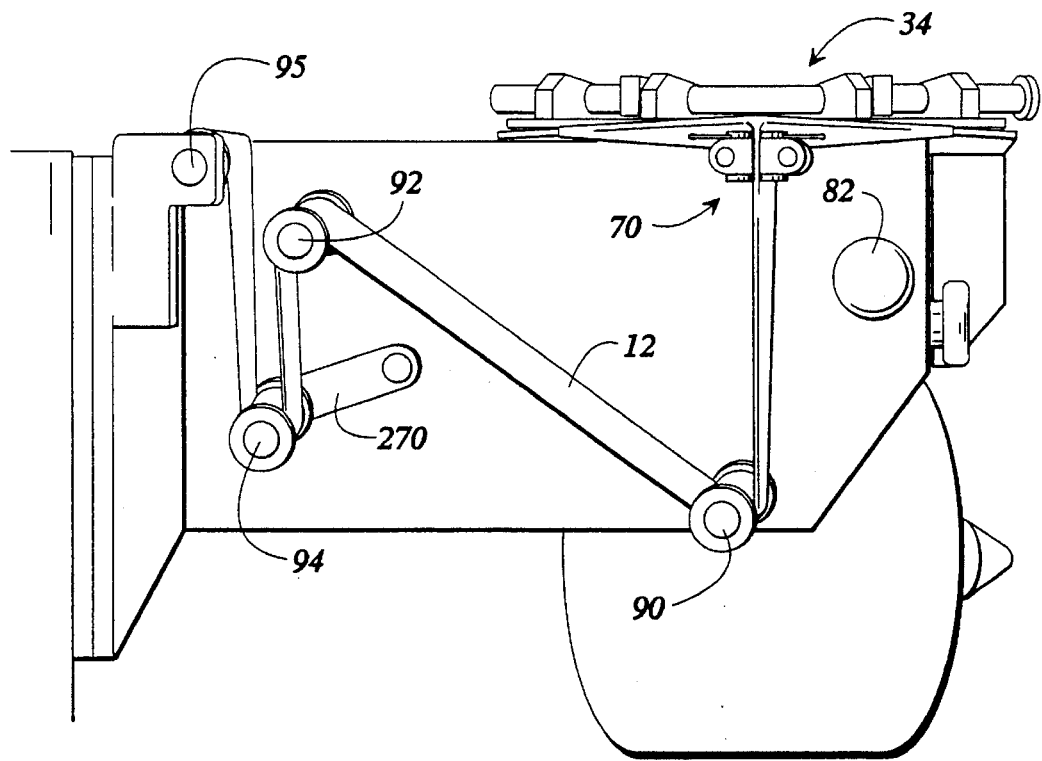
FIG 7
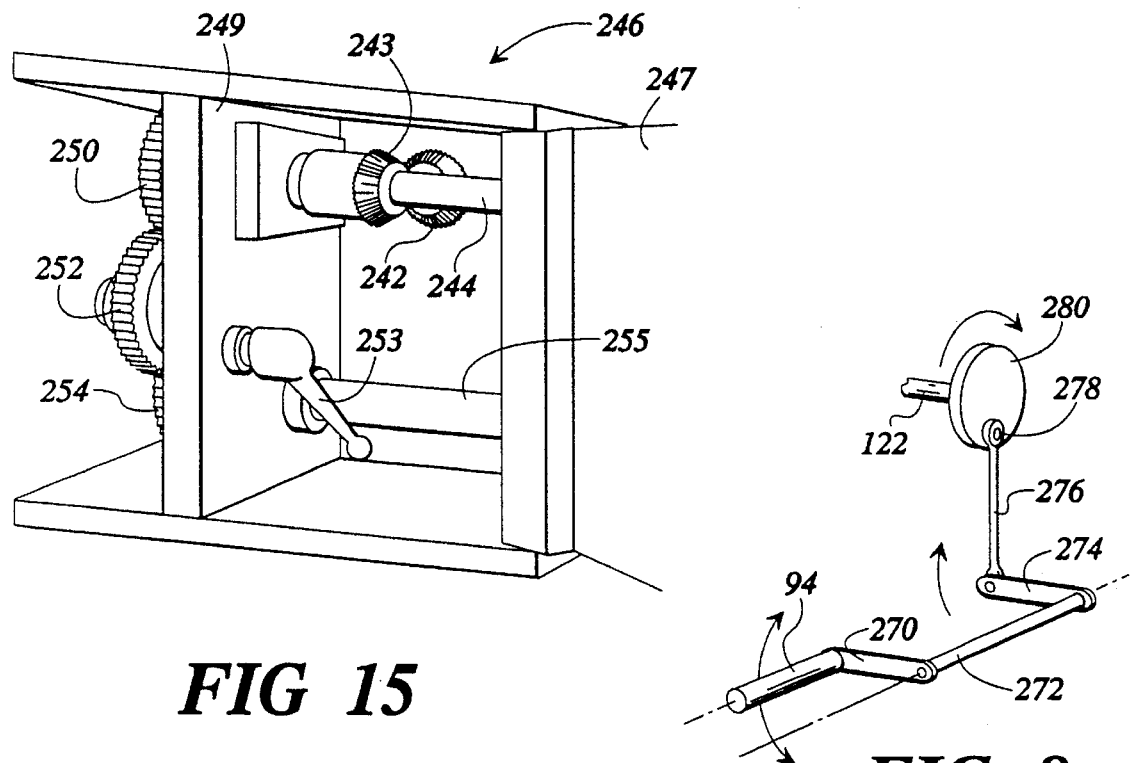
FIG 15
FIG 8

APPARATUS FOR POCKETED COIL CONSTRUCTION HAVING IMPROVED TRACKING CHARACTERISTICS

CROSS-REFERENCES TO RELATED APPLICATIONS

This is a continuation of application Ser. No. 08/003,259, now abandoned filed Jan. 12, 1993, as a divisional application of Ser. No. 07/637,290, filed Jan. 3, 1991, now U.S. Pat. No. 5,186,435.

TECHNICAL FIELD

The present invention relates generally to the art of spring assembling, and more particularly to improvements to a method and apparatus for making a series of connected individually pocketed coil springs for mattresses and cushions.

BACKGROUND OF THE INVENTION

In the so-called Marshall construction, each coil spring is encased within its own fabric sack, which is generally made in the form of a pocket defined between two plies of a fabric strip connected together at intervals along transverse lines spaced along the strip. The two-ply strip is generally formed by folding a strip of fabric upon itself along its longitudinal centerline, leaving the overlapped plies along the unjoined opposite edges of the strip to be connected to each other to close the pockets defined between the transverse lines of connection after the springs are inserted.

In accordance with one known method and apparatus for inserting and compressing coil springs between opposed plies of a fabric strip and thereafter securing the plies transversely and longitudinally to form closed pockets, the plies of fabric are secured by thread stitching. The mechanical requirements upon sewing machines for accomplishing the requisite stitching in making series connected individually pocketed springs are severe, and the mechanisms required for moving the sewing machines in relation to the fabric strip, particularly in accomplishing the transverse stitching which defines the pockets, has of necessity been complicated. The productivity of such machines is generally limited by the limitations of the sewing machines, including the problem of thread breakage.

Therefore, a method of ultrasonically welding a ply of fabric together was developed, disclosed in U.S. Pat. Nos. 4,234,983 and 4,439,977, both of which are incorporated by reference.

As seen in U.S. Pat. No. 4,439,977, various pneumatic cylinders are used to provide various operations, such as the driving of ultrasonic heads and insertion of compressed coils. Furthermore, a folding assembly is shown which utilizes a fabric folder indicated generally as 24. A length of pocketed coils, now referred to as a pocketed coil string, are provided such that shown in U.S. Pat. No. 4,234,983. Such pocketed coil strings may be fastened by adhesives in order to provide innerspring constructions such as that shown in U.S. Pat. No. 4,578,834, herein incorporated by reference.

In reference to U.S. Pat. No. 4,234,983, transverse lines of attachment 10 combined with longitudinal lines of attachment 18 in order to provide pockets for the coil springs therein. It may be appreciated that it is preferable that the free edges of the folded fabric 24 should preferably be in coalignment. It should also be appreciated that a certain distance must be had between the longitudinal line connection of 18 and the fabric edges 24, in order to provide sufficient strengths to the line 18 of connection and discourage separation thereon.

The above methods, apparatuses, and configurations includes several advantages, although shortcomings do exist. For example, it may be understood that a need exists for a method and apparatus for manufacturing pocketed coil strings which provides accurate coalignment of the free edges of the fabric, in order to discourage fabric waste. Furthermore, a need exists for accurate positioning of the folded fabric when passing underneath the weld heads, particularly the longitudinal weld head, in order that a longitudinal weld line is accurately positioned an acceptable distance from the free edges of the fabric. If the weld is too far from the free edges, fabric is wasted. If the longitudinal weld line is too close to the free edges of the fabric, the weld line may be weak and prone to separation.

Furthermore, a need has arisen for a more "gentle" feed of the fabric from the feed roll and through the folding process. In the prior art apparatuses, the fabric is "indexed" one pocket width distance in each cycle, with this indexing being done in a single step followed by a dwell step. For high speeds and/or large pocket widths, this feed technique can result in excessive stresses on the fabric downstream of the weld station, which may result in unacceptable folding, tracking, or feeding. Therefore, a need exists for an improved feed system.

Additionally, a need has arisen to eliminate, to as much extent as possible, pneumatic cylinders used to drive and/or operate various elements of an apparatus for manufacturing pocketed coil strings. It has been found that, especially in colder regions, pneumatic air cylinders tend to require an extensive warm up period. Furthermore, such air cylinders tend to require a great deal of adjustment if the machine is to be operated during the warm up period. Finally, it has been found that the very nature of pneumatic cylinders requires that they be repeatedly adjusted throughout their lifetimes. Finally, air cylinders tend to limit the maximum operating speed of a particular apparatus. In light of these disadvantages, a need has arisen to eliminate as many pneumatically-controlled processes as possible in order to reap the advantages in both speed and maintenance of direct-drive configurations.

These and other needs prompted the development of the apparatus 10, in particular, certain of its elements, illustrated in the following description.

SUMMARY OF THE INVENTION

The present invention provides improvements over prior an configurations by providing improvements in fabric handling, as well as improvements made possible by direct-drive configurations as opposed to pneumatically driven configurations. The invention provides for improved fabric folding by means of a folding plate having folding fingers beneath the folding plate. The invention likewise provides unique adjustment features to assist in accurate coalignment of free edges of the fabric, as well as to assist in improved alignment of the folded fabric into the welding station. A dancer roller is provided to provide a more "smooth" feed of the fabric through the folding station notwithstanding the downstream pull-and-dwell process required to insert a spring into the folded fabric and subsequently weld the fabric. An intermittent movement gearbox is also provided to provide a direct-drive configuration to compress the springs prior to their insertion.

Therefore, it is an object of the present invention to provide an improved method and apparatus for making a series of pocketed coil strings.

It is a further object of the present invention to provide an improved method and apparatus for making a series of coil strings which includes an improved fabric tracking configuration.

It is a further object of the present invention to provide an improved method and apparatus for making a series of coil strings which includes an improved folding process.

It is a further object of the present invention to provide an improved method and apparatus for making a series of coil strings which includes an improved fabric feeding process.

It is a further object of the present invention to provide an improved method and apparatus for making a series of coil strings which eliminates the need for pneumatic cylinders used in prior-art configurations.

Other objects, features, and advantages of the present invention will become apparent upon review of the following detail description of embodiments of the invention, when taken in conjunction with the drawings.

BRIEF DESCRIPTION OF THE DRAWINGS

FIG. 4 is a pictorial view of a portion of the assembly 10, particularly showing the folding finger assembly 70, with a portion of the rearwardly-extending fingers shown in dotted line.

FIG. 5 is atop plan isolated view of the folding plate 24.

FIG. 6 is a isolated view of the folding finger assembly 70.

FIG. 7 iS a front view of a portion of the apparatus, particularly illustrating the fabric path after the fabric is folded by the folding finger assembly 70.

FIG. 8 is an isolated view of the elements intermediate the main shaft 122 and the dancer roller 94, illustrating pivoting axes shown in dotted line.

FIG. 15 is another view of change gear box assembly.

DETAILED DESCRIPTION OF THE PREFERRED EMBODIMENT

General Configuration and Operation

Figure 1:
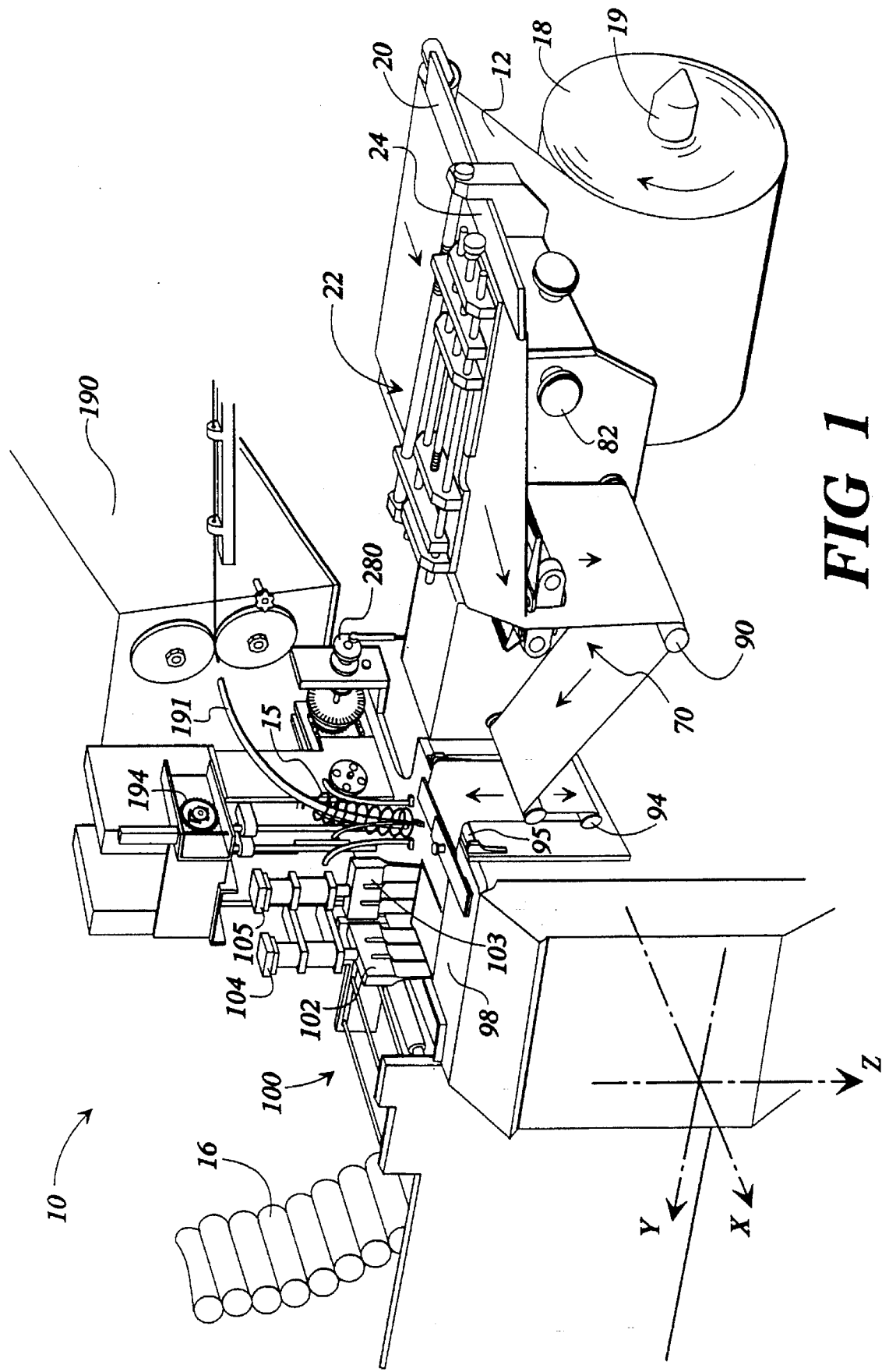
FIG. 1 is pictorial view of major elements of the apparatus 10 according to the present invention, shown in conjunction with illustrated orientations "X", "Y", and "Z".

Referring now generally to the drawings in which like numerals indicate like elements, FIG. 1 generally illustrates the apparatus 10 according to the present invention. Stated in general terms, the apparatus accepts an elongate sheet of material 12 (such as that known by the trade name "Duon" sold by Phillips Fiber Corporation), folds it in half along its lengthwise centerline, and subsequently inserts coil springs 15 into corresponding pockets defined by weld lines, resulting in a pocketed coil string 16 such as that shown as 22 in FIG. 3 of U.S. Pat. No. 4,439,977, discussed above.

The apparatus 10 accepts the elongate sheet of fabric material 12 from a roll 18 of like material. The fabric is pulled off of the roll 18, passes across a splicing table 20, and subsequently passes under an edge guide assembly 22 and across a folding plate 24. At the downstream side of the folding plate, the fabric 12 is drawn off of the folding plate and passes into a folding finger assembly 70 having a pair of folding fingers 72, 73 (see FIG. 6) which grasp the fabric therebetween such that the fabric is folded substantially in half, with a single fold line running the length of the fabric, and with its free edges preferably in alignment.

The folded fabric 12 then passes across fixed rollers 90, 92, then under dancer roller 94, over fixed roller 95, and finally into the spring insertion and welding stations.

Once the folded fabric enters the spring insertion station, coil springs are inserted between the two plies of fabric, and then transverse and longitudinal welds are provided in the fabric in the welding station as discussed in U.S. Pat. No. 4,439,977, such that pocketed coil strings 16 are ultimately created as shown in U.S. Pat. No. 4,234,983.

More Detailed Discussion of Configuration and Operation

For purposes of this discussion, certain directional terms will be used in order to facilitate description of various elements and their operation. For example, the "front" of the machine is the side of the apparatus which would face the operator if operating the controls of the device. The "right" side of the machine is that side which the operator would consider his right hand side.

Furthermore, mutually perpendicular orientations "X", "Y", "Z", are defined, are shown in FIG. 1, and are for the purposes of assisting the understanding of particular orientations and directions of travel of various elements described herein. It may be understood that the "X" orientation is the direction along which an operator would be facing if the operator's shoulders were "square" to the front of the machine, and operating the controls. The "X" orientation is substantially horizontal. The "Y" orientation is likewise substantially horizontal, being perpendicular to the "X" orientation. The "Z" orientation is substantially vertical, as discussed before being substantially perpendicular to both the "X" and the "Y" orientations.

Referring to FIG. 1, the fabric sheet 12 is generally elongate in nature, has a substantially consist thickness, a substantially constant width, and is substantially flat after being drawn off of the roll 18. The roll 18 is positioned upon a adjustable spindle 19, which has a substantially horizontal longitudinal axis extending along an axis substantially parallel to the "Y" orientation.

The spindle 19 itself rotates along an axis lying in an axis substantially parallel to the "Y" orientation. The fabric 12 travels along an axis substantially parallel to the "X" orientation along the upper surface of the splicing table 20. It may be understood that the roll 18 may be adjusted side-to-side (along an axis substantially parallel to the "Y" orientation), thereby adjusting side-to-side the "X"-oriented path of the fabric being fed from the roll into the apparatus in a side-to-side manner.

The splicing table 20 defines a substantially planar upper surface, and is provided to allow fabric lengths from different fabric rolls to be spliced together thereupon as known in the art. The splicing table 20 is pivotably mounted relative to the frame of the apparatus 10, such that the splicing table 20 may be pivoted in and out of its desired position, so that elements positioned beneath the splicing table may be more easily accessed as desired. However, during normal operation of the apparatus 10, the splicing table is in a stationary position, with its upper (fabric side) surface being substantially horizontal.

After the fabric 12 passes over and slides along the splicing table 20, the fabric 12 then exits the splicing table and then slides onto and along a folding plate 24. The folding plate 24 defines a substantially horizontal and planar upper surface 25 (See also FIG. 3), with a substantially rectangular main body portion 23 and a pointed portion 26 downstream of the rectangular body portion partially defined by tapering edges 27, 28, tapering at a taper angle T to meet at point 29 (See also FIG. 5). The upper surface 25 of the folding plate 24 is substantially horizontal and substantially in the same plane as the upper surface of the splicing table 20, such that fabric sliding along the splicing table 20 slides onto the folding plate without substantial horizontal movement.

The Edge Guide Assembly

Figure 2:
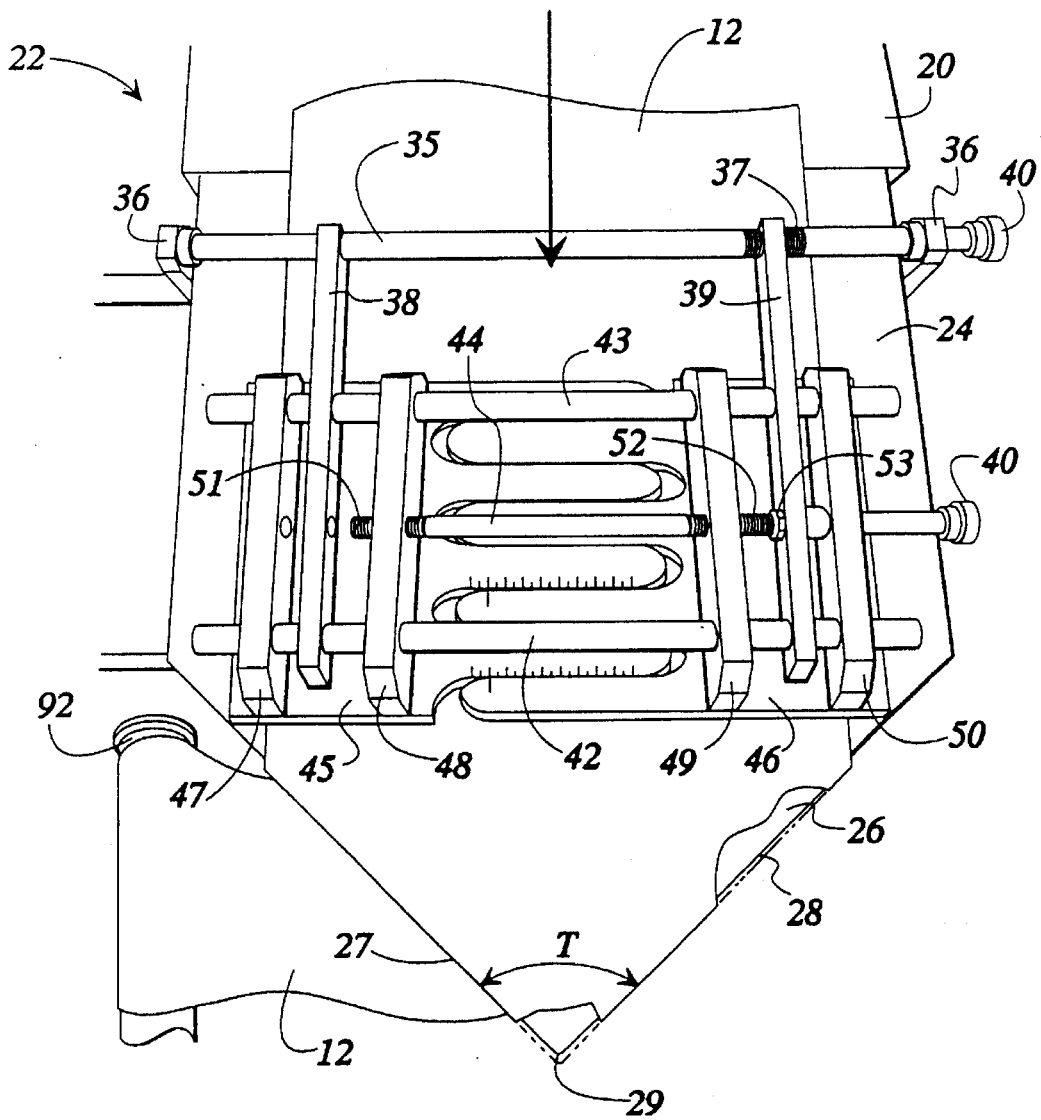
FIG. 2 is view of a fabric folding assembly of the present invention; as one would view the assembly from above the plane of the fabric folding plate 24. A portion of the fabric 12 is cut away for illustrative purposes to expose the folding plate.
Figure 3:
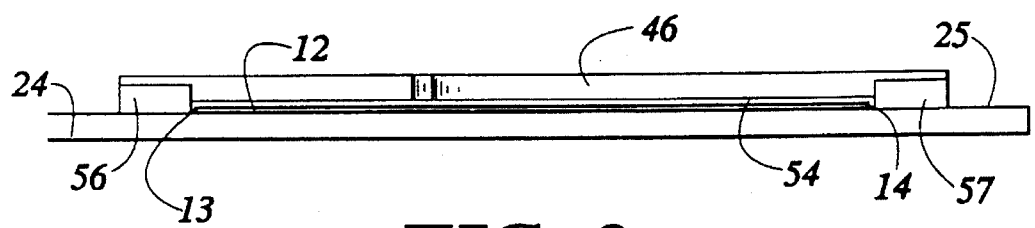
FIG. 3 is an end view of a portion of the fabric folding assembly illustrated in FIG. 2.

Positioned above the folding plate 24 is a fabric edge guide assembly 22 (See FIGS. 2 and 3). The fabric edge guide assembly 22 does not float along with the folding plate 24, but instead is pivotably mounted relative to the frame about a shaft 35, which is itself mounted to a pair of upwardly extending flanges 36 which are rigidly affixed to the frame and are positioned on each side of the fabric path.

The shaft 35 is rotatably mounted within bearings within the flanges 36, such that the shaft 35 may rotate about its longitudinal axis by manual rotation of adjustment knob 40, but may not move along its longitudinal axis relative to the flanges. A portion of the shaft 35 includes a threaded portion 37.

A pair of pivot bars 38, 39, extend forwardly from the shaft 35. The "left" pivot bar 38 includes a smooth bearing which allows the left pivot bar to smoothly slide along the length of the shaft 35, as well as to rotate about the shaft. The "right" pivot bar 39 is threadably engaged with the threaded portion 37 of the shaft 35. Therefore, it may be understood that the "right" pivot bar 39 is not free to freely slide along the length of the partially threaded shaft 35 due to the threaded engagement. However, the right pivot bar 39 is allowed to rotate about the partially threaded shaft 35, although as it rotates about the shaft it may be understood that it will likewise be traveling along the length of the shaft, due to the nature of the threaded engagement.

By manual rotation of the shaft 35 by use of knob 40, the threaded engagement between the partially threaded shaft 35 and the right pivot bar 39 allows for left-to-right adjustment of the entire fabric edge guide assembly 22 (along a path substantially parallel to the Y orientation), which promotes accurate alignment of the fabric 12 just prior to the folding process.

The fabric edge guide assembly 22 is attached to the left and right pivot bars 38, 39. The fabric edge guide assembly includes front and rear slide bars 42, 43, a reverse-threaded adjustment shaft 44, a left fingered plate 45 having left outside lo and inside flanges 47, 48, respectfully, and a fight fingered plate 46 having fight inside and outside flanges 49, 50, respectfully. The front and rear slide bars 42, 43, and the reverse-threaded adjustment shaft 44 each have a substantially circular transverse cross-section and have longitudinal axes substantially parallel to the "Y" orientation. The fingered plates 45, 46, mesh such that the fingers nestle between each other.

Front and rear smooth slide bars 42, 43, extend through the flanges 47, 48, 49, and 50, and are configured to slide along their longitudinal axes relative to bearings fixed within the flanges. However, the front and rear smooth slide bars 42, 43, are rigidly affixed to the left and fight pivot bars 38, 39.

The reverse-threaded adjustment shaft 44 in the fabric edge guide assembly 22 includes a pair of threaded sections 51, 52, each threaded in opposite directions, such as one being a fight hand screw thread and the other being a left hand screw thread. These threaded portions threadably engage the left and fight inside flanges 48, 49. The reverse-threaded adjustment shaft 44 is also attached to the fight pivoting bar 39 by means of a thrust beating at 53, such that the thrust beating, attached to the reverse-threaded adjustment shaft, prevents relative longitudinal movement of the reverse-threaded adjustment shaft 44 relative to the fight (or left) pivot bar, but the shaft 44 is allowed to rotate along its longitudinal axis relative to the pivot bars 38, 39.

Therefore, it may be seen that as the reverse-threaded adjustment shaft 44 is rotated in one direction, the threaded portions, being threaded in opposite directions, tend to cause the inner flanges to be moved in opposite directions, each sliding relative to the smooth slide bars. The thread count on each of the threaded sections is substantially the same, therefore the inside flanges will be moving at the same rate of speed (although in differing directions) along the length of the reverse-threaded adjustment shaft 44 during its rotation. As the fingered plates 45, 46, are fixed to a corresponding inside flange 48, 49, the plates will likewise be so moving. In the preferred embodiment, as the shaft is rotated, the plates tend to move apart or together, depending on the direction of rotation.

Referring now to FIG. 3, elongate edge guide bars 56, 57, are mounted along the outer edges of the fingered plates, such that they extend with their longitudinal axes substantially parallel to the intended fabric path (the "X" orientation) and each have a portion extending a small distance downwardly relative to the lower surfaces 54 of the fingered plate, such that the edge guides provide shoulders for guiding the corresponding opposing edges 13, 14 of the fabric sheet 12. It may be seen that the guide bars, 42, 43 combine with the fingered plates 45, 46, and the upper surface 25 of the folding plate 24, combine to provide a slot which accepts the thickness of the fabric 12.

As the guide bars 56, 57, are rigidly affixed to their corresponding fingered plates 45, 46, it may be seen that manual adjustment of the shaft 44 as above-described causes the edge guides to be moved apart or together relative to a preferably fixed imaginary "center" line of the edge guide assembly. By adjusting shaft 35, this centerline preferably should intersect the "point" 29 of the folding plate 24. As may be seen, it may be seen that it is preferential that the center line of the fabric 12 pass over the point 29 of the folding plate to promote accurate edge-to-edge folding of edges 13, 14.

It may understood that two configurations assist in the guiding of the fabric over the splicing table and the folding plate, one being the fabric edge guide assembly 22, and the other being the adjustable feature of the fabric feed roll 18, which, as discussed above, allows for left-to-right adjustment of the roll relative to the folding and splicing tables.

The Folding Action

As discussed above, the folding plate 24 includes a forward pointed portion 26 which defines a pair of tapering edges 27, 28, tapering together at a taper angle T to a point 29. The taper angle is in excess of 90 degrees, and is preferably 94 degrees, although other angles may be used without departing from the spirit and scope of the present invention. Referring now also to FIGS. 4–6, the folding finger assembly 70 is positioned generally beneath and toward the front of the folding plate 24, and allows for folding of the fabric 12 after it passes off of the folding plate.

The folding finger assembly 70 includes a pair of rearwardly-extending fingers 72, 73, each pivotably mounted relative to a corresponding mounting bracket 74, 75, along a substantially vertical axes P, Q, (parallel to the "Z" orientation), each bracket being rigidly affixed to a corresponding mounting bar 76, 77. The mounting bars 76, 77, each are substantially circular in transverse cross section and have a longitudinal axis substantially parallel to the "X" orientation.

A flange 78 extends from each of the fingers, which is spring-loaded by springs 79 to encourage the fingers 72, 73 to "pinch" together, thus maintaining a bias against the fabric, to encourage accurate folding. One end of each spring is attached to a flange 78, and the second end of the spring is attached to the mounting bars at 80. A pair of stops 69 are rigidly attached relative to the underside of the folding plate 24 to prevent the rear ends of the folding fingers from passing thereby.

The mounting bars 76, 77, extend rearwardly from the pivot mounting brackets 74, 75 and pass through a pair of fixed walls rigidly affixed relative to the frame of the apparatus (the forward wall shown as 81 in FIG. 4), and are slidably mounted within bearings in the walls such that the bars may slide along their longitudinal axes relative to the walls. Between the walls, the bars are each mounted to a pair of brackets (not shown) themselves rigidly mounted to the undersurface of the folding plate 24.

Therefore, it may be seen that the folding finger assembly 70 is rigidly affixed relative to the folding plate, and slidably moves inwardly and outwardly with the folding plate relative to the frame. An adjustment knob 82 is fixed to the front end of a threaded shaft (not shown), which is captured by a thrust bearing affixed relative to the frame of the apparatus 10, and is threadably engaged with a bracket (not shown) affixed relative to the folding plate. Manual adjustment of knob 82 causes the inward and outward sliding movement of the folding plate described above, said movement being along an axis substantially parallel to the "X" orientation.

As discussed further in this application and discussed in U.S. Pat. No. 4,439,977, longitudinal welds are provided in the folded fabric, at a location adjacent to the free edges of the folded fabric. It may be understood that it is desirable to provide the longitudinal welds at a position relative to the free edges of the fabric such that an effective weld is provided, but fabric intermediate the longitudinal weld line and the free edges is not wasted. Therefore, the above adjustment of knob 82 is provided, which allows for adjustment of the free edges of the fabric relative to the stationary longitudinal weld head. This adjustment feature is an important part of the present invention.

Referring now to FIGS. 4 and 6, it may be seen that the fabric 12 comes off the front end of the folding table, and then is folded across edges 27, 28, such that the free edges 13, 14 of the fabric sheet are brought closer together. As the upper planar surfaces of the folding fingers 72, 73 are closely adjacent to the lower surface of the folding plate, it may be seen that the fabric is folded very severely across the edges 27, 28. At the time the fabric passes through the gap 81 between the fingers, it is substantially folded in half along its length, such that its free edges 13, 14, are preferably in alignment, and the width of the folded fabric is substantially one-half the width of the unfolded fabric.

The springs 79 encourage the folding fingers 72, 73 to maintain an inward (with respect to the gap) bias against the fabric, to provide effective folding and handling. It may be understood that the folding fingers 72, 73, are independently spring-biased. Should, for some reason, one side of the fabric length have a "loose" spot, the corresponding folding finger will preferably take up the slack in that spot, thus encouraging effective folding.

After the folding process, it may be seen that the fabric is substantially folded in half, such that its free edges are preferably in registration and alignment, and the fabric width is now approximately one-half its original width due to the folding over. As the fingers are not completely closed, the folded fabric halves may not be in planar contact, but may be slightly separated. Should the free edges 13, 14 of the fabric 12 not be in alignment (one edge extending further away from the fold line than the other) adjustment of the fabric edge guide assembly 22 may be made as described above, until, by trial and error, the free edges of the fabric are acceptably aligned.

The Path of the Folded Fabric

Referring now also to FIG. 7, after passing through the pair of folding fingers, the fabric 12 then extends downwardly and along a path substantially perpendicular to the travel of the fabric over the folding table and the splicing table, said path being substantially parallel to orientation "Z".

After traveling along the above path, the fabric 12 is then wound under an idling roller 90, such that it is then passing in a leftward and upward direction. It may be seen that at this time the fabric is preferably completely folded over, with little or no gap being intermediate the two half portions. The fabric is then wound around a second idling roller 92, such that it then extends in a generally downward direction. The fabric then winds upwardly around a "dancer" roller 94. The dancer roller 94 moves up and down during operation of the apparatus, the particular movement being discussed in further detail later in this application.

After leaving the dancer roller 94, the fabric is wrapped around a third idler roller 95, and then eventually passes into the weld station 100 (See FIG. 1), being supporting by a substantially flat and horizontal weld table 98.

Entry into the Welding Station

Upon reaching the weld stations 100, the fabric 12 is positioned upon the weld table 98, such that it may be welded by transverse seam ultrasonic head 102, and longitudinal seam ultrasonic head 103. These ultrasonic heads 102, 103 are attached to sliding carriage assemblies 104, 105, respectively, which are each slidably mounted relative to the frame of the apparatus 10 along coparallel axes each substantially parallel to the "Z" orientation. The ultrasonic heads provide transverse and longitudinal welds similar to those disclosed U.S. Pat. Nos. 4,234,983, and 4,439,977.

Coil springs 15 are inserted into pockets provided in the fabric, as discussed in the above patents. However, the means for compressing these coils prior to their insertion into the fabric, according to the present invention, is different to that disclosed in the above patents. The above patents disclose the use of pneumatic air cylinders in order to drive a head in contact with the upper end of the coils, in order that the coils may be compressed axially. In contrast, the present invention contemplates use of a series of sprockets, gears, racks, etc., in order to provide a "direct-drive" configuration which will provide the needed action. As this direct drive configuration has its origin in the main shaft of the device, discussion of the main shaft is now made.

The Main Shaft

Figure 9:
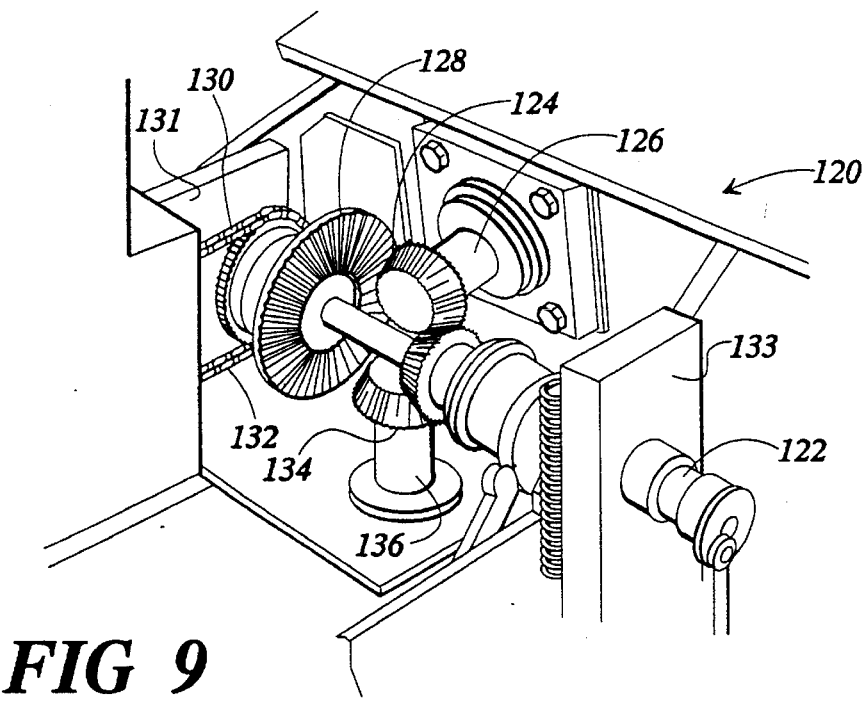
FIG. 9 is a close-up pictorial view of the main shaft and elements associated immediately therewith, with a cover plate removed for illustrative purposes.

Referring now to FIG. 9, the main shaft assembly 120 includes a plurality of elements mounted on a main shaft 122, all of which rotate about the longitudinal axis of the main shaft, which is substantially horizontal and parallel to the "Y" orientation. The main shaft 122 is driven by means of a bevel gear 124 attached to the front end of an inclined drive shaft 126 driven by a typical electric motor (not shown) which also drives the coiler 190. The bevel gear 124 engages a bevel gear 128 mounted to the main shaft 122. Rigidly mounted on the main shaft to the left of the bevel gear 128 is a sprocket 130, driving a chain 132. To the left of sprocket 130 is a block 131 which rigidly supports a bearing accepting a section of main shaft 122. A second block 133 likewise rigidly supports a bearing accepting a second section of shaft 122.

A bevel gear 135 attached to shaft 122 drives a bevel gear 134, which is mounted to a substantially vertical shaft 136. Vertical shaft 136 extends downwardly and supports a crank arm (not shown). This crank arm is attached to one end of a linkage (not shown) which has its opposite end attached to an insertion shoe (not shown) having a V-shaped front notch. The insertion shoe is driven in oscillating front-to-back motion by the crank arm-linkage configuration driven by constantly rotating shaft 136. The timing of the apparatus 10 is such that the V-shape notch of the shoe accepts a compressed spring, and inserts the compressed spring into the folded fabric (while stationary), which is subsequently welded.

Figure 10:
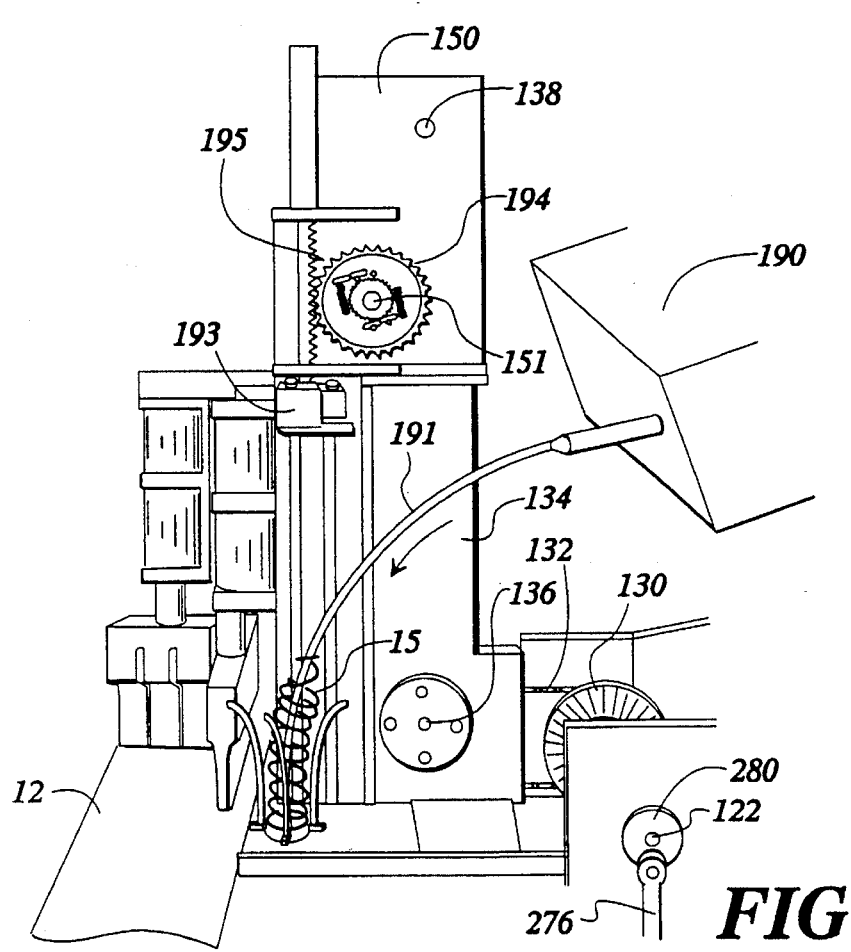
FIG. 10 is a side view of the apparatus 10, particularly illustrating the path the of the spring from the coiler 190.

Referring now to FIG. 10, it may be seen that the chain 132 driven by sprocket 130 enters within a chain drive column 134. Within the chain drive column is a sprocket pair (not shown) mounted upon a single shaft, rotatably mounted relatively to chain drive column 134 along a horizontal axis, substantially parallel to the "Y" orientation, said axis passing approximate point 136. One sprocket in the sprocket pair accepts chain 132, and a second sprocket in the pair drives an upwardly extending chain loop (not shown) inside the chain drive column, which drives a sprocket (not shown) mounted upon an input shaft 149 of the intermittent movement gear box 150 (See also FIGS. 11A–11H) positioned atop the chain drive column. One end of this input shaft is mounted within a bearing 138 shown in FIG. 10.

Operation of the intermittent movement gear box 150 will be discussed in greater detail further in this description. However, it may be understood that main shaft 122 rotates at a substantially constant and continuous rotational speed during normal operations of the apparatus 10. Therefore, it may be understood that due to the above-described sprocket-chain connection, the input shaft of the intermittent movement gear box 140 is rotated at a substantially constant and continuous rotational speed.

Driving of the Intermittent Movement Gear Box

The intermittent movement gear box 150 includes an oil bath, and includes a plurality of gears each rotatably mounted along substantially horizontal axes, each substantially parallel to the "Y". The intermittent drive gear box 150 converts constant rotational motion into an "intermittent" rotational motion, such that constant, continuous rotation of the input shaft of the gear box 150 causes intermittent, reversing, rotation at its output shaft.

Referring now to FIGS. 11A–11H, discussion is now made of the various gear elements within intermittent movement gear box 150. Note that for the discussion of this gear configuration alone, the use of the terms "left" and "right" are made as if one is viewing the drawings, not the device. One would have the view shown in FIGS. 11A–11H if standing on the right of the apparatus and facing it along the "Y" orientation.

The intermittent movement gear box 150 includes an upper gear 152, a middle gear 154, a star gear 156, a gear cluster including a large lower right gear 158 and a small lower right gear 160, and a small lower left gear 162. All of the above-referenced gears are mounted upon bearings as known in art, along substantially vertical axes of rotation each substantially parallel to the "Y" orientation, such that each are bathed in oil.

Upper gear 152 defines a plurality of radially-extending teeth, as does middle gear 154. The teeth of upper and middle gears 152, 154, are in mutual engagement, such that clockwise rotation of the upper gear 152 causes counter-clockwise rotation of middle gear 154. As the size of the gears 152, 154, are substantially similar in size and have similar tooth counts, the rotational speed of the two gears are synchronized, albeit in opposing directions.

Upper gear 152 includes a pair of sidewardly-extending guide rollers 164, and a single drive roller 165. Middle gear 154 likewise includes corresponding guide rollers 166, and a drive roller 167. These rollers are rotatably mounted relative to pins extending sidewardly from the gears.

Star gear 156 defines two radially-extending slots 169, 170, a mouth 172 defined by two stops 173, 174, and defines a toothed section 176.

The teeth of toothed section 176 are in toothed engagement with small lower right gear 160. Gear 160 is mounted on a shaft along with large lower right gear 160, such that they rotate together. Large lower right gear 158 defines a plurality of radially-extending teeth, which engage radially-extending teeth of small lower left gear 162. Small lower gear 162 is attached to the output shaft 151 of the gear box 150, which is attached to elements described later in this description.

Figure 11A:
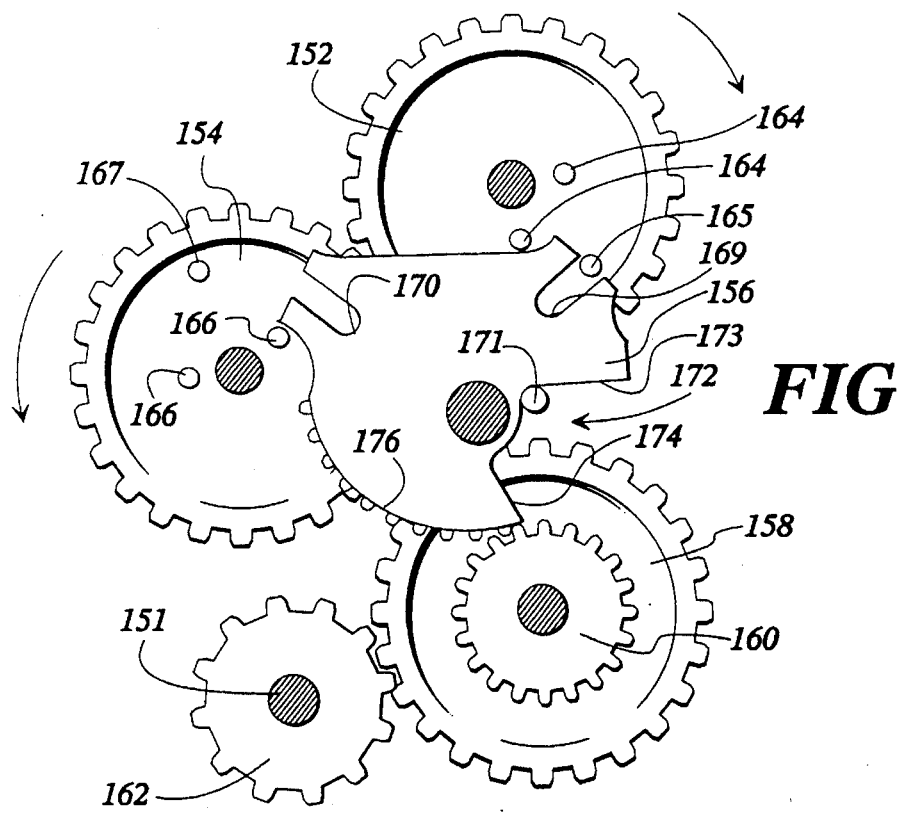
FIGS. 11A–11H are "snap shot" illustrations of sequential relationships of gears and other elements within an intermittent movement gearbox.

As previously described, upper gear 152 is mounted to an input shaft 149 of gearbox 150 which is also attached to a sprocket-chain configuration powered by the main shaft 122. The rotational movement of the main shaft, during continuous operation of the apparatus, is a substantially constant rotation. Therefore, it may be seen upper gear 152 likewise rotates in a substantially constant manner, likewise driving middle gear 154 in a substantially constant rotational manner due to the meshing described above. As seen in FIG. 11A, drive roller 165 of upper gear 152 is positioned at the mouth of slot 169 of star gear 156. From this point, FIGS. 11A to 11H illustrate "snapshots" of various positions of the elements of the gearbox 150 during a cycle of the upper gear 152, which is a cycle of the main shaft 122.

Figure 11B:
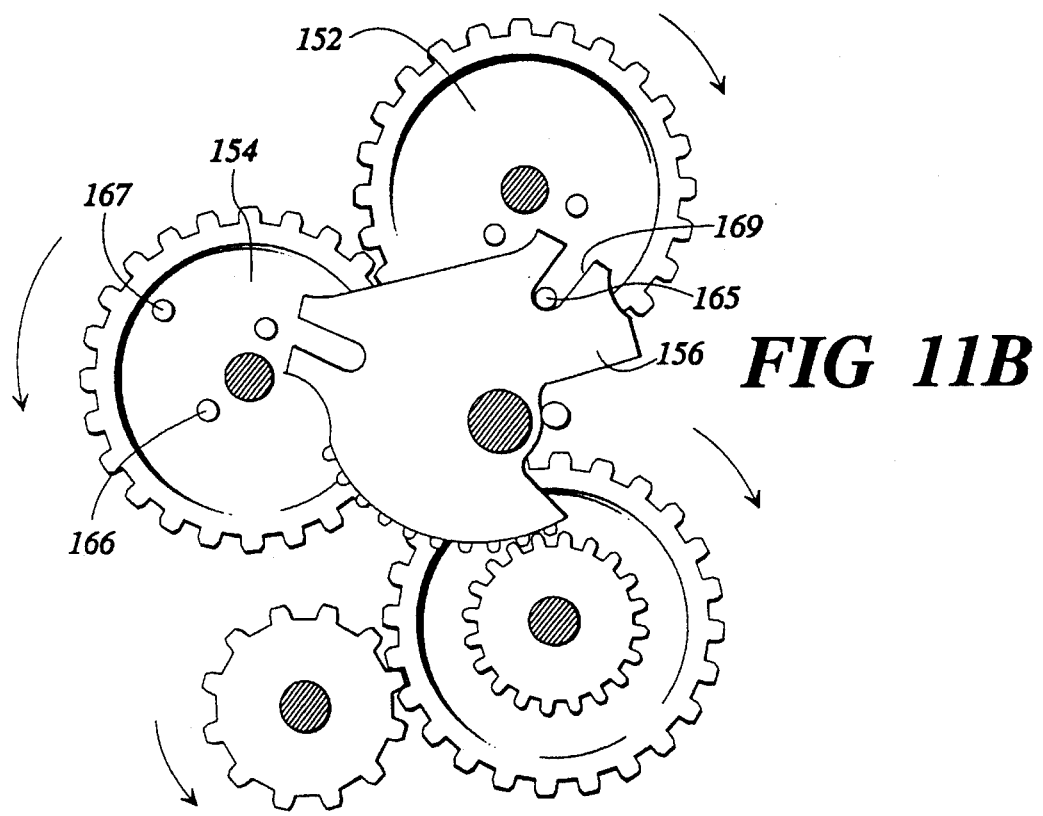
Figure 11C:
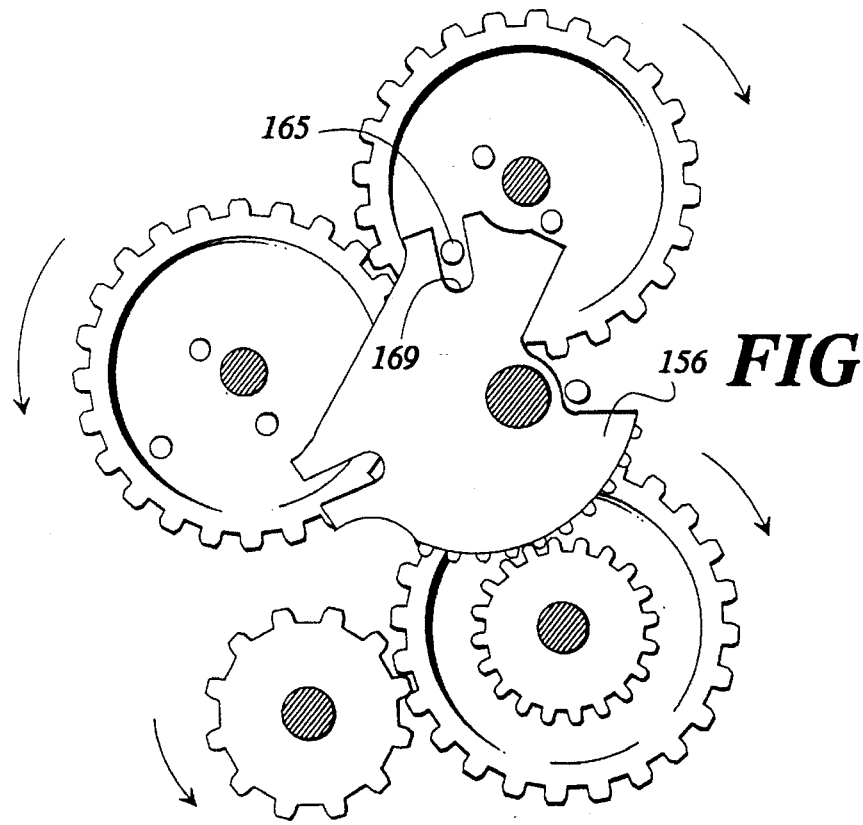

As may be seen from FIGS. 11A to 11B, rotation of the upper gear 152 causes the drive roller 165 to be positioned further within slot 169, eventually causing star gear 156 to be rotated in a counter-clockwise fashion. Comparing FIG. 11B to 11C, the further rotation of the star gear 156 may be seen, with the roller 165 shown in 11C being at a stage such that the roller 165 is being withdrawn from the slot 169.

Figure 11D:
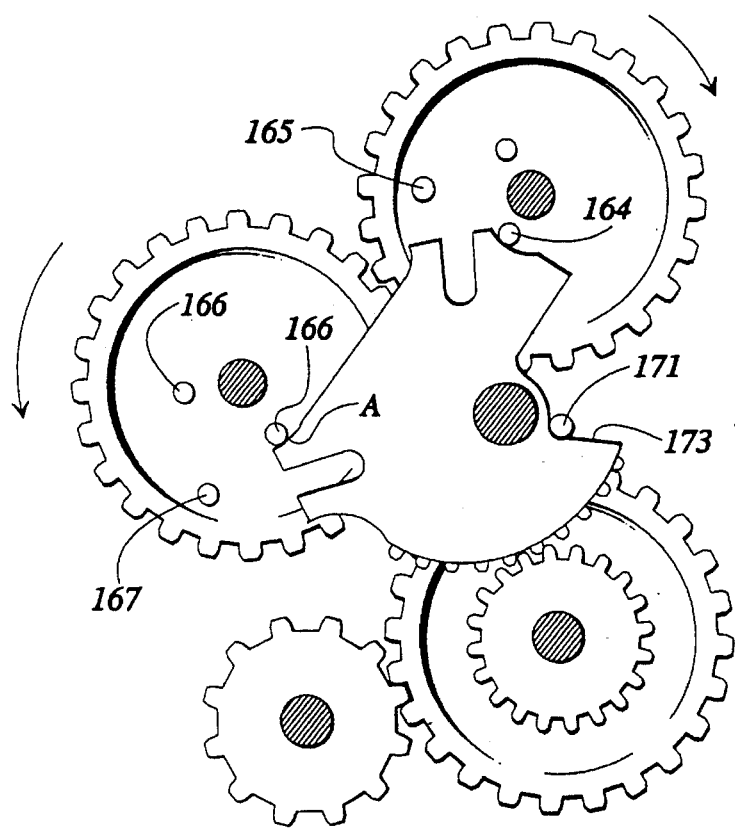

In FIG. 11D, it may be seen that the roller 165 of upper gear 152 is withdrawn from the slot 169, and star gear 156 has stopped. Stop surface 173 is provided to prevent further clockwise rotation of the star gear 156, due to contact with stop roller 171, which is fixed relative to the gearbox 150. Guide roller 164 prevents movement of the star gear in a clockwise direction. After the roller 165 of upper gear 152 exits slot 169, it may be seen that the drive roller 167 of middle gear 154 is approaching slot 170, which is now in its path.

Figure 11E:
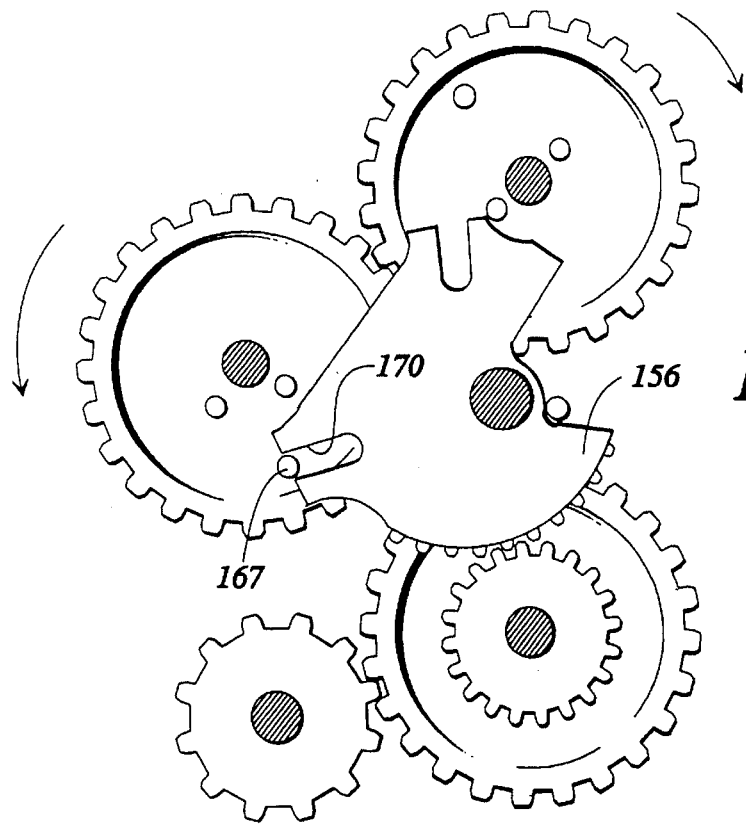
Figure 11F:
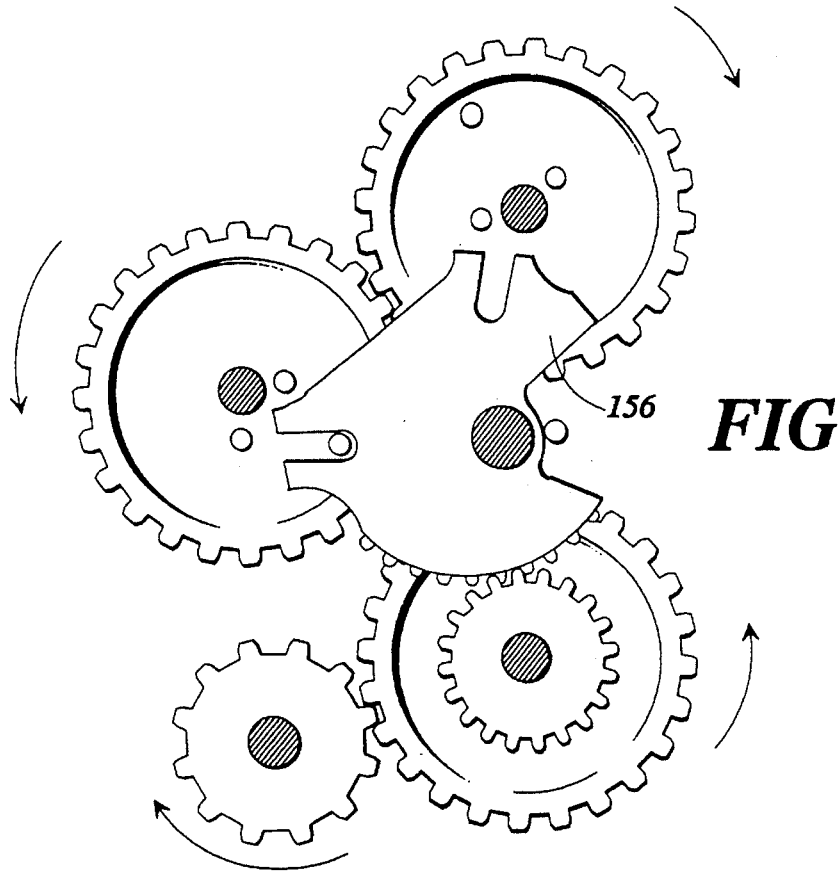
Figure 11G:
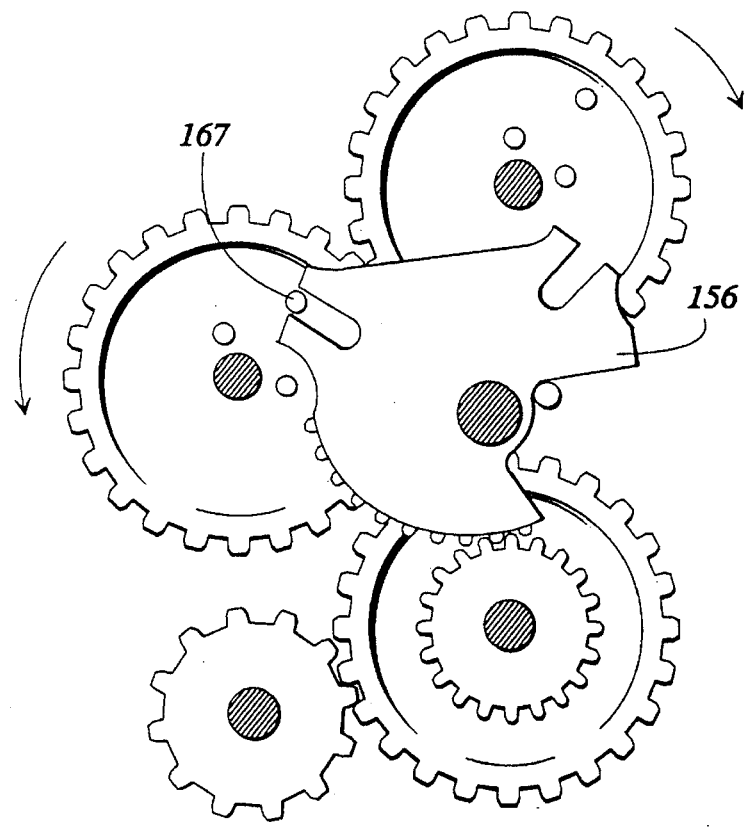

In FIG. 11E, it may be seen that the roller 167 is entering the mouth of slot 170 of star gear 156. From the position shown in 11E to that shown in FIG. 11F, it may be seen that the drive roller 167 of middle gear 154 causes the star gear 156 to be rotated in a clockwise manner. From the position shown in FIG. 11F to that in FIG. 11G, the star gear 156 is further rotated in a clockwise manner.

Figure 11H:
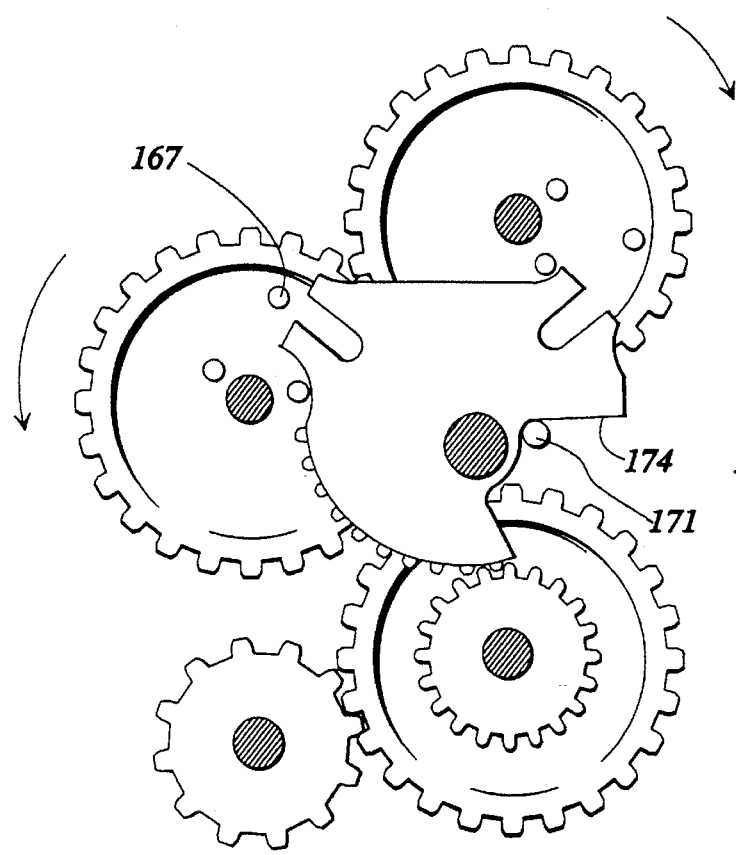

Referring to FIG. 11H, it may be seen that drive roller 167 has exited slot 170. At this time, the star gear 156 is not moving, but instead is again in a stationary or "dwell" position. Stop surface 174 is provided to prevent further counterclockwise rotation of the star gear 156, due to contact with stop roller 171. From the configuration shown in FIG. 11H, the gear cluster configuration returns to that shown in FIG. 11A. From this point, the same sequence beginning with FIG. 11A is repeated.

As may be seen from FIGS. 11A–11H, the continuous rotation of the upper and middle gears 152, 154, causes a counterclockwise rotation of the star gear of middle gear 154 when being driven by roller 165, followed by a "dwell" period between the time the drive roller 165 exits the star gear 156 and the time the drive roller 167 of middle gear 154 enters the slot 170 of the star wheel, followed by a clockwise rotation of the star gear 156 when being driven by drive roller 167, followed by a second "dwell" period until the process is repeated.

It may be seen that the guide rollers provide a guiding function to assure proper location of the star gear in its extreme positions, such that the drive rollers may properly enter their respective slots. For example, in FIG. 11A, one of the guide rollers 165 is in contact with an arcuate portion of the star gear, such that it is "locked" into position between the guide roller and the stop pin 171. Similar locking is shown in FIG. 11D, with a guide pin 166 contacting an arcuate surface defined by arcuate portion A of the star gear. It may be understood that the guide roller passes closely by or is in contact with the arcuate during a portion of its path of rotation with gear 154. However, some tolerance is made to prevent contact of the star gear simultaneously with a guide roller and the stop pin to prevent seizure of gear box 150.

As the star gear 156 is in toothed engagement with the small lower right gear 162 as described above, it may seen that the intermittent, reversing, rotation of the star gear described above, likewise causes the gears 160, 158, 162, to rotate in an intermittent, reversing, manner. This intermittent, reversing, action is preferable in that this action is transferred through the output shaft 151 of the gearbox, to a clutched gear assembly 194 positioned on the right side of the gearbox 150, as seen in FIG. 10.

Compression of the Coils

Referring now to FIGS. 1 and 10, a coiler 190 as discussed in U.S. Pat. No. 4,439,977, provides coil springs 15 and depositing the springs on a curved rod 191, such that uncompressed coil springs 15 slide along the rod and are deposited into a "compression zone" under compression head 193.

The compression head 193 is slidably mounted along a substantially vertical axis (parallel to the "Z" axis) such that the compression head 193 can move upwardly to allow for insertion of the springs 15 into the compression zone, and subsequently to move downwardly to compress the springs in the compression zone.

As described above, the output shaft 151 of the intermittent movement gear box 150 rotates in an intermittent, reversing, nature. The output shaft 151 drives a external clutched gear assembly 194 which drives a substantially vertical toothed rack 195 through a toothed intermeshing connection. The lower end of the rack 195 is rigidly attached to the compression head 193.

The clutched gear assembly 194 includes a "detent" feature, which prevents damage which may occur if coils become jammed within the compression area. If coils become jammed, the detent becomes disengaged, and the operator resets the assembly 194 after clearing the jam.

Driving of the Welders

Figure 12:
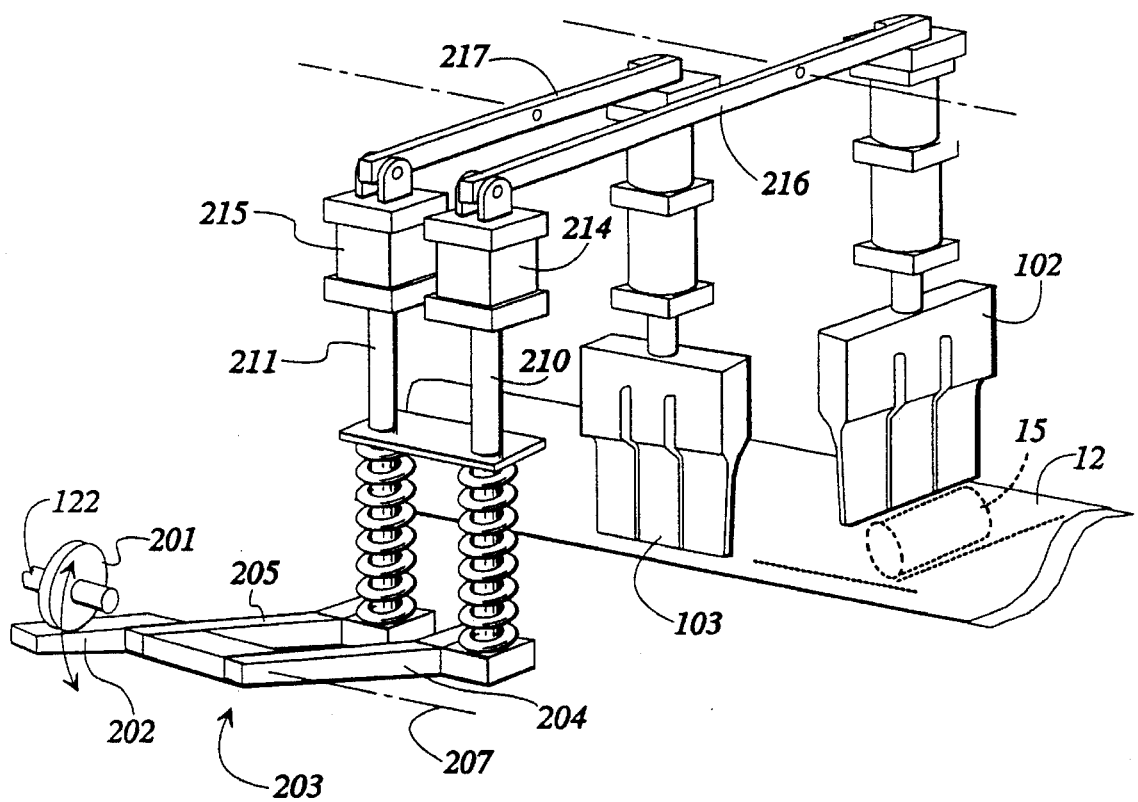
FIG. 12 is an isolated rear pictorial view of a portion of the apparatus, illustrating the movement of the ultrasonic welding heads caused by rotating cam 201.

As discussed above, a sprocket 130 drives a chain 132 which encourages movement of the gearbox 150. Positioned to the left of such a sprocket is a block 131 having a bearing, and to the left of this block, is mounted an elliptical cam 201 (see FIG. 12). This elliptical cam 201 provides intermittent movement for the pair of ultrasonic weld heads 102, 103. One of the ultrasonic weld heads 102 provides the transverse seam, and the other ultrasonic weld head 103 provides the edge seam (see also FIG. 1).

The cam 201 bears upon the end of a rearwardly-facing lever arm 202, which is one element of a lever arm assembly 203. The lever arm assembly 203 is pivotably mounted about axis 207 (substantially parallel to the "Y" orientation) relative to the frame, and also includes a pair of forwardly-directed lever arms 204, 205, each of which is pivotably affixed to the lower end of corresponding left and right push rods 210, 211. The upper ends of the push rods 210, 211, are mounted to the lower ends of corresponding pneumatic cylinders 214, 215, which have their upper ends attached to corresponding rocker arms 216, 217, which have their rear ends attached to the pneumatic cylinders, and their forward ends attached to corresponding ultrasonic weld assemblies such as those seen in U.S. Pat. No. 4,439,977.

It may understood that the rocking motion of the rocking arm assembly 203, causes up-and-down movement of the push rods 210, 211, which likewise causes a corresponding rocking movement of the rocker arms 216, 217. The corresponding rocking movement of the rocking arms 217, 218, likewise causes up-and-down movement of the ultrasonic weld heads 102, 103.

The pneumatic cylinders 214, 215, intermediate the push rods and the corresponding rocking arms provide an adjustable (by adjusting the air pressure) force imparted by the ultrasonic heads 102, 103 to the fabric during the welding process.

The pneumatic cylinders 214, 215 are not, in the preferred embodiment of the invention, intermittently energized, instead they are continuously energized. It may understood that, when the pneumatic cylinders are energized in their expanded position, the ultrasonic heads 102, 103, will contact the plate when the push rods are in their fully upward position. When the pneumatic cylinders are retracted, the ultrasonic weld heads will not contact the plate when the push rods are in their fully upward position. This is an advantage, in that the pneumatic cylinders may be selectively disengaged in order to feed or remove fabric 12 beneath the weld heads, when the push rods may still be in their fully upward position.

Driving of the Rubber Rollers

Figure 14:
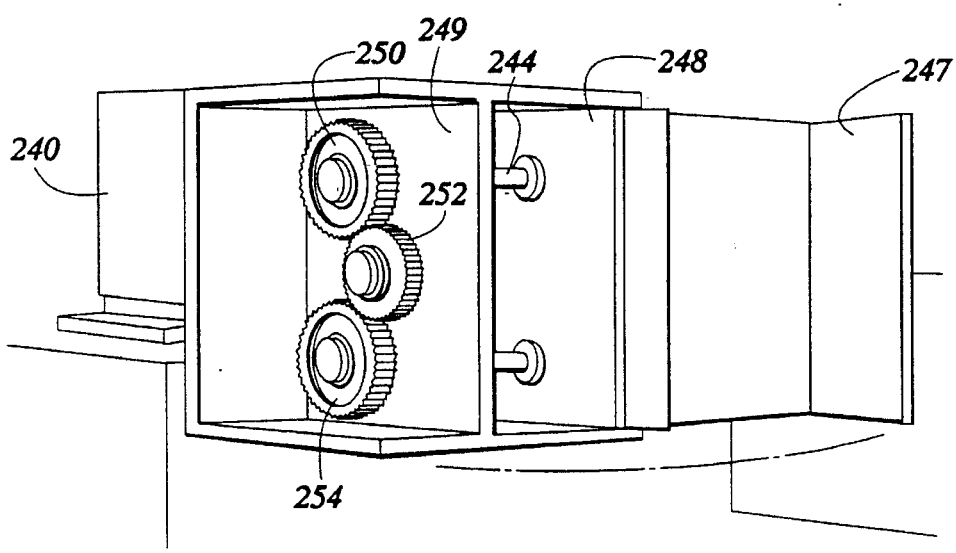
FIG. 14 is a more detailed view of the change gear box assembly, with its door 247 in an "open" position.

Further to the left of the cam 201 on the main shaft 122 is a typical coupling (not shown), which provides end-to-end connection between the main shaft and a input shaft to a typical o geneva gearbox 240 (see FIG. 14), which converts one cycle of rotation of the main shaft 122 into 180° of similarly-oriented rotation of the output shaft followed by a dwell period of 180°.

Referring also to FIG. 15, the output shaft of the geneva gearbox has a bevel gear 242 rigidly attached thereon. This bevel gear 242 is meshed with a second bevel gear 243 which is itself is rigidly affixed to a upper shaft 244 rigidly mounted within a change gear box 246 (which is itself likewise rigidly affixed to the frame). Shaft 244 has its longitudinal axis substantially parallel to the "X" orientation, and is rotatably mounted relative to walls 248, 249 of the change gear box. A change gear 250 is mounted to the rear end of the upper shaft.

Change gear 250 is engaged with a swing gear 252 which is configured to swing (by means of handle 253) in and out of position and engagement with the gear 250 and lower gear 254, which is rigidly attached to the rear end of lower shaft 255. Lower shaft 255 is rotatably mounted within change gear box 246 in walls 248, 249. The change gear 250 may be replaced with a larger or smaller gear to provide differing gear ratios between gear 250 and gear 254.

Figure 13:
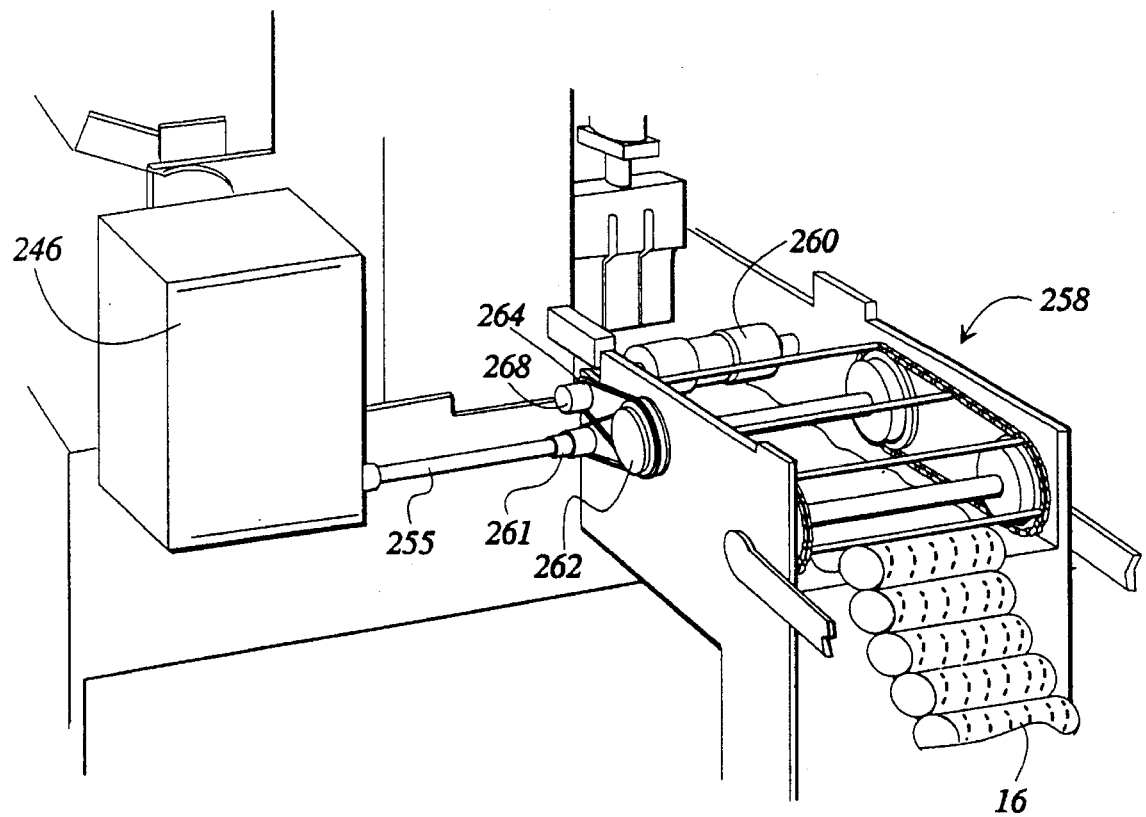
FIG. 13 is a left side view of the apparatus 10, illustrating the change gear box 246 in a closed position. Also shown are a roller cage assembly and rubber roller each driven by a shaft 255 exiting the change gear box 246.

Referring also to FIG. 13, lower shaft 255 extends outwardly and forwardly from change gear box 246, and eventually drives a roller cage assembly 258. A coupling 261 is mounted on the lower shaft 255, which drives a lower rubber roller (not shown), positioned beneath the fabric path. A mating upper rubber roller 260 is positioned above the fabric path, and is configured to snugly capture the folded fabric between the rollers and to allow the folded fabric (with the springs inside) to be drawn through the apparatus such that the upper rubber roller is driven. The upper rubber roller 260 is rotatably mounted to a shaft mounted within a pair of bearings rigidly affixed to the frame and having a head 268 attached to one end. A pair of elastic drive bands 264 driven by head 268, drive a head 262 attached to one shaft of the roller cage assembly 258, such as that shown in U.S. Pat. No. 4,439,977, which also includes a second shaft, with both shafts having a pair of sprockets mounted thereupon. The four sprockets combine to provide a "cage" which draws the fabric and coils in a right-to-left direction as described in U.S. Pat. No. 4,439,977.

The Dancer Roller

Referring now to FIGS. 7, 8, and 16A–D, the dancer roller 94 is rotatably mounted along its longitudinal axis relative to an arm 270, which itself is affixed to a shaft 272 which is rotatably mounted within the frame along its longitudinal axis. The shaft 272 extends through the frame, and is likewise attached to a second arm 274, which is attached to a tie rod 276.

The tie rod 276 includes two ends which are pivotably mounted in perpendicular axes. The lower pivoting axis is parallel to the "X" orientation, and the upper pivoting axis is parallel to the "Y" orientation. The upper end of the tie rod 276 is pivotably mounted to a pin 278, which is itself rigidly mounted to a disk 280 in an offset manner. The disk 280 is rigidly mounted to the right end of main shaft 122.

Operation of the dancer roller in relation to other elements of the apparatus 10 is now described. In reference to FIG. 16A, location points "X", "Y", "Z" have been designated at spaced-apart locations on and along the fabric 12, approximate to the location of the welding station. A stationary horizontal scale exhibiting equally spaced apart points 0, 1, 2, 3, 4 is shown alongside points X, Y, Z, to illustrate their travel thereby. Similarly, a vertical scale, having the same scale as the horizontal scale, illustrates the travel of points A, B, C, thereby. As seen below, due to movement of the dancer roller, points A, B, C, do not necessarily move at the same rate along the fabric path as points path X, Y, and Z.

It may be understood that the fabric is drawn through the welding station by the rubber rollers as previously discussed, such that for each operational cycle of the apparatus, the fabric is drawn four incremental distances relative to the welding station along the vertical increment scale (shown in FIG. 16A), and then is at rest or "dwells". Such intermittent "pulls" exerted on the fabric have potential disadvantages in that periodic forces exerted onto the fabric may cause tracking or folding problems. Therefore, the dancer roller 49 and its synchronized movement have been provided in order to provide lesser peak stresses on the fabric when passing off of the feed roll and through the folding station.

Figure 16A:
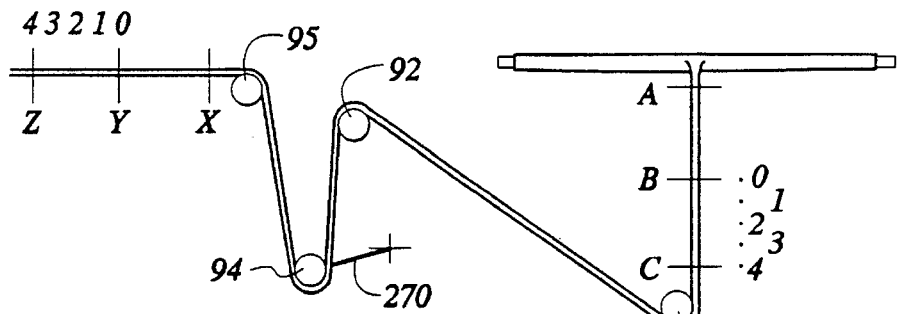
FIGS. 16A–16D are "snap shot" sequential illustrative views of the dancer roller in operation.
Figure 16B:
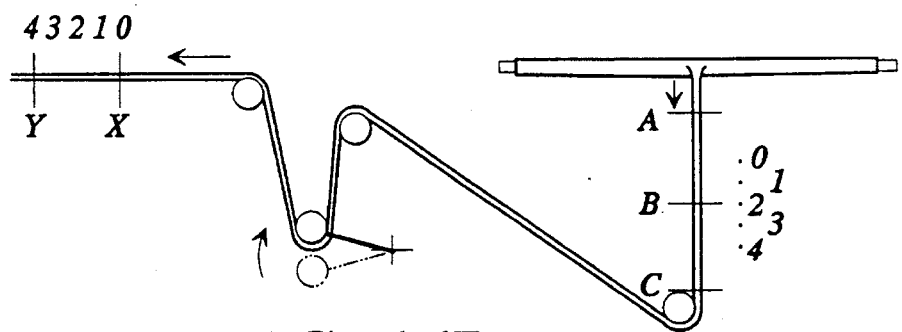
Figure 16C:
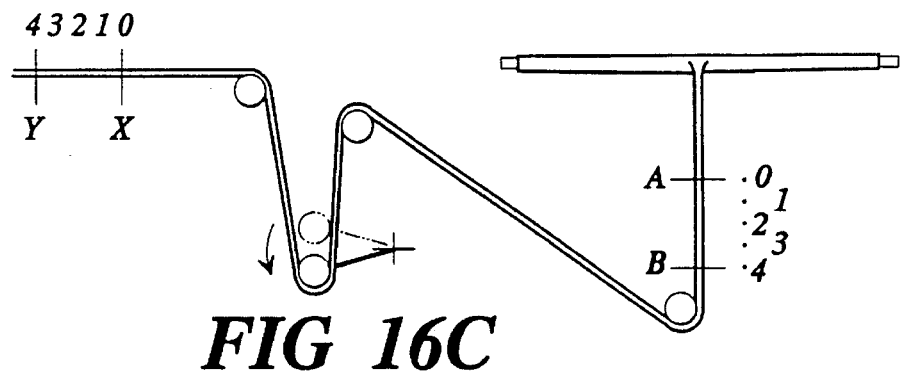
Figure 16D:
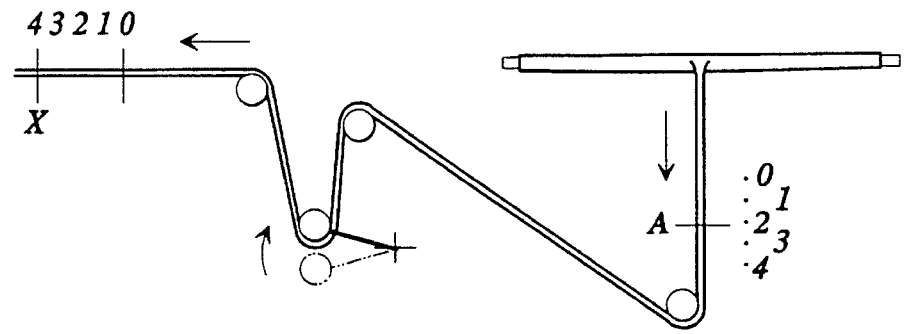

Referring now to FIG. 16A, the point Y on the fabric is located along incremental designation 0 along the vertical scale. The dancer roller 49 mounted on arm 270 is in its downwardmost position. Point B is likewise positioned alongside incremental designation 0 on the vertical scale. In moving from the position shown in 16A to that shown 16B, the fabric is drawn four increments past the horizontal scale such that point Y is now at incremental designation 4. However, during this time period the dancer roller 94 has been pivoted to its upwardmost position, decreasing the length of the fabric path thereby. The distance the dancer roller has moved provides some slack in the fabric, causing the fabric coming out of the folding station to only have to move two incremental points along the vertical scale. From the position shown in 16B to 16C, the fabric remains stationary (in its dwell position) in the welding station. However, due to downward movement of the dancer roller 94, the fabric is drawn two incremental distances through the folding station and along the vertical scale, as the fabric path has been lengthened. Movement of the fabric from 16C to 16D is the same as that shown in 16A through 16B. Therefore, it may be seen that the apparatus goes through one operational cycle in its position shown in FIG. 16A to FIG. 16C. As noted above, the main shaft driving the dancer roller rotates once per each cycle of operation of the apparatus. Therefore, it may be seen that the dancer roller moves up and down once for each apparatus cycle, and allows for less stress to be applied to the fabric when passing from the feed roll and through the folding station, as it is drawn two incremental distances twice per cycle, as opposed to four incremental distances once per cycle.

Conclusion

Therefore, it may be seen that the present invention provides improvements to a method and apparatus for providing pocketed coil strings, the improvements including improvements in alignment of the fabric, improvements in folding of the fabric, improvements in compression of the springs prior to their insertion into the fabric pockets, and improvements in feed of the fabric along the fabric path.

As discussed above, the edge guide assembly provides for improved tracking of the fabric. The folding finger assembly provides for improved folding of the fabric. The dancer roller provides improved feed of the fabric along the fabric path, reducing stresses on the fabric. The intermittent movement gear box eliminates pneumatic cylinders, and provides a direct-drive configuration which allows the spring to be intermittently compressed. The pneumatic cylinders used in-line between the push rods and the upper pivoting arms driving the pneumatic air cylinders provide for a "cushion", and their reversible feature allows for removal or manipulation of the fabric as desired.

Variations from Embodiment Shown in Drawings An alternate edge guide assembly is contemplated other than that shown as 22 in FIG. 2. Front and rear slide bars similar to that shown as 42 and 43 are contemplated, except that the slide bars are pivotably mounted relative to brackets positioned on the left hand side of the fabric path, with the guide bars being pivotable about a substantially common axis substantially parallel to the "X" orientation. At the ends opposite the mounting brackets, the alternate slide bars are tied together by an end bracket rigidly affixed to their right ends. Left and right fingered plates are used in this alternate embodiment, except that flanges 47, 48, 49, and 50 are integral parts of the fingered plates due to their being cast. However, the slide bars slide relative to these flanges as discussed in connection with the assembly 22. The reverse-threaded rod 52 similarly cooperates with the flanges of the alternate embodiment. However, instead of a knob being attached to the right hand side of the reverse-threaded shaft, a central grip is provided intermediate the inside flanges. Manual rotation of this grip provides separation or retraction of the fingered plates relative to each other.

Left-to-right adjustment of the fabric path in the alternate embodiment is provided by an adjustment shaft extending through the end bracket and having a threaded portion threadably engaging the end bracket. This shaft continues to extend through the upwardly extending flanges of the right fingered plate, with a smooth sliding relationship therethrough.

A bearing is attached to the end of the left-to-right adjustment shaft such that the outer race of the bearing engages an annular slot cut in the grip. Rotation of the left-to-fight adjustment shaft causes movement of the grip in a sideward direction, likewise causing movement of the entire alternate edge guiding assembly.

While a preferred embodiment of the apparatus 10 accordance with the present invention has been illustrated and described, it will be understood that to those skilled in the art that changes and modifications may be made therein without departing from the invention in its broader aspects. Various features of the inventions are defined in the following claims.

What is claimed is:

1. An apparatus for manufacturing a pocketed innerspring construction for a mattress comprising:

(a) means for drawing a length of fabric having a substantially uniform width from a roll of said fabric;

(b) a folding plate having a substantially horizontal, planar surface extending from an upstream end thereof to a downstream end, said downstream end of said surface having tapering lead folding edges converging at a downstream end point;

(c) means for urging said length of fabric from said upstream end to said downstream end of said surface and for causing said fabric to pass over said folding edges on the downstream end of said surface with the downstream end point essentially in contact with the center of said fabric width so that said fabric folds substantially in half along its length with the width of the folded fabric being substantially one-half of the width of the fabric and with the two free longitudinal edges of said fabric being in general alignment;

(d) a pair of inwardly-biased, pivotably mounted folding fingers positioned below said surface and having a gap therebetween to receive said folded fabric passing over said folding edges of said surface, said folding fingers being structured to pinch together to maintain a bias against fabric passing therebetween to enable accurate folding of said fabric with said longitudinal edges being in substantial registration and alignment;

(e) means for inserting coil springs between said folded fabric halves and for joining said fabric in a manner such that said coil springs are contained within pockets in said fabric; and (f) means for connecting said pocketed coil springs together to form an innerspring construction.

2. The apparatus of claim 1 wherein said tapering lead folding edges of said downstream end of said surface converge at said downstream end point at a taper angle in excess of 90 degrees.

3. The apparatus of claim 2 wherein said taper angle is about 94 degrees.

4. The apparatus of claim 1 wherein at least one of said folding fingers is spring biased causing the folding fingers to pinch together to maintain said bias against folded fabric passing therebetween.

5. The apparatus of claim 1 wherein said folding fingers are independently spring-biased.

6. The apparatus of claim 1 including a fabric edge guide assembly for adjusting the position of the longitudinal edges of said length of fabric on said folding plate to assure that the fabric passes over the folding edges of the planar surface in proper alignment with the downstream end point of said surface essentially in contact with said center of said fabric width.

7. The apparatus of claim 6 wherein said fabric edge guide assembly is mounted above said folding plate in position to engage the fabric as it passes over said substantially horizontal, planar surface from said upstream end to said downstream end thereof.

* * * * *